United States Patent
Choate (10) Patent No.: US 10,990,362 B1
(45) Date of Patent: Apr. 27, 2021

(54) CONVERTING PROGRAMS TO VISUAL REPRESENTATION WITH READING COMPLIED BINARY

(71) Applicant: TG, LLC, Los Altos, CA (US)

(72) Inventor: Eric Choate, Berkeley, CA (US)

(73) Assignee: TG LLC, Sebastopol, CA (US)

( * ) Notice: Subject to any disclaimer, the term of this patent is extended or adjusted under 35 U.S.C. 154(b) by 0 days.

(21) Appl. No.: 14/600,922

(22) Filed: Jan. 20, 2015

Related U.S. Application Data (60) Provisional application No. 61/928,918, filed on Jan. 17, 2014.

(51) Int. Cl.
| | | |
|---|---|---|
| *G06F 9/44* | (2018.01) | |
| *G06F 9/455* | (2018.01) | |
| *G06F 9/445* | (2018.01) | |
| *G06F 8/40* | (2018.01) | |
| *G06F 8/52* | (2018.01) | |

(52) U.S. Cl.
CPC . *G06F 8/40* (2013.01); *G06F 8/52* (2013.01)

(58) Field of Classification Search
CPC ........ G06F 8/34–38; G06F 9/455; G06F 8/40; G06F 8/52; G06F 8/42; G06F 17/28; G10L 15/18; G10L 25/00
See application file for complete search history.

(56) References Cited

U.S. PATENT DOCUMENTS

| | | | | |
|---|---|---|---|---|
| 9,009,669 B2* | 4/2015 | Pletter | ................. | G06F 11/3688 717/124 |
| 9,087,049 B2* | 7/2015 | Raichelgauz | ........... | G06F 17/28 |
| 9,104,661 B1* | 8/2015 | Evans | ..................... | G06F 17/28 |
| 9,928,067 B2* | 3/2018 | Zhong | ................. | G06F 9/30181 |
| 2004/0268311 A1* | 12/2004 | Pizzoli | ..................... | G06F 9/454 717/124 |
| 2006/0059460 A1* | 3/2006 | Phillips | ..................... | G06F 8/70 717/109 |
| 2006/0106593 A1* | 5/2006 | Schultz | ................. | G06F 17/212 704/5 |
| 2006/0130006 A1* | 6/2006 | Chitale | ................. | G06F 17/275 717/136 |

(Continued)

OTHER PUBLICATIONS

David Ung, Machine-Adaptable Dynamic Binary Translation, 2000, pp. 41-50 https://dl.acm.org/doi/pdf/10.1145/351397.351414 (Year: 2000).*

*Primary Examiner* — Mongbao Nguyen (57) ABSTRACT

Converting a first format program application, into a second format, which can be presented using a device type for which it wasn't designed. Examining the first format for commands that change screen state, and determining instructions in the second format with similar effect. First, searching the object-code calls that write to the screen, and for each determining those parameters that define outputs in a source human language, which can be altered to a target human language. Suggestions from the programmer can determine such output calls, or which parameters control elements of the source human language, to instead select element of the target human language. Alternatively, second, when the program is organized in a known format, searching for calls to output in the source human language, examining the object-code for parameters that define that output, and altering the program to output in a target human language.

12 Claims, 2 Drawing Sheets

(56) References Cited

U.S. PATENT DOCUMENTS

| | | | | |
|---|---|---|---|---|
| 2006/0206861 A1* | 9/2006 | Shenfield | G06F 8/35 | 717/106 |
| 2006/0271920 A1* | 11/2006 | Abouelsaadat | G06F 9/4448 | 717/137 |
| 2007/0003025 A1* | 1/2007 | Alves | G10L 21/06 | 379/52 |
| 2007/0033005 A1* | 2/2007 | Cristo | G06F 17/279 | 704/9 |
| 2007/0206927 A1* | 9/2007 | Kim | G11B 27/034 | 386/241 |
| 2008/0189096 A1* | 8/2008 | Apte | G06F 9/454 | 704/2 |
| 2008/0294399 A1* | 11/2008 | Comair | G06N 3/004 | 703/6 |
| 2009/0012788 A1* | 1/2009 | Gilbert | G10L 21/06 | 704/235 |
| 2010/0115424 A1* | 5/2010 | Young | G06F 40/58 | 715/753 |
| 2010/0121630 A1* | 5/2010 | Mende | G06F 17/2785 | 704/7 |
| 2011/0314451 A1* | 12/2011 | Baumann | G06F 9/4448 | 717/125 |
| 2013/0103383 A1* | 4/2013 | Du | G06F 3/0488 | 704/3 |
| 2013/0144596 A1* | 6/2013 | Lui | G06F 40/58 | 704/2 |
| 2013/0226555 A1* | 8/2013 | Lerum | G06F 9/454 | 704/2 |
| 2013/0227522 A1* | 8/2013 | Lerum | G06F 9/44 | 717/120 |
| 2013/0262077 A1* | 10/2013 | Fuji | G06F 17/2827 | 704/2 |
| 2013/0289998 A1* | 10/2013 | Eller | G10L 13/08 | 704/260 |
| 2014/0046661 A1* | 2/2014 | Bruner | H04N 21/4884 | 704/235 |
| 2014/0089826 A1* | 3/2014 | Boyd | G06F 3/0481 | 715/765 |
| 2014/0136180 A1* | 5/2014 | Little | G06F 9/454 | 704/2 |
| 2014/0195466 A1* | 7/2014 | Phillipps | G06N 99/005 | 706/12 |
| 2014/0282437 A1* | 9/2014 | Ma | G06F 8/52 | 717/136 |
| 2015/0046909 A1* | 2/2015 | Ligman | G06F 11/3688 | 717/131 |
| 2015/0067507 A1* | 3/2015 | Bohrer | G06F 16/638 | 715/716 |
| 2015/0154181 A1* | 6/2015 | Dmytryshyn | G06F 9/4448 | 704/2 |
| 2015/0220512 A1* | 8/2015 | Heinemeyer | G10L 15/005 | 704/2 |

* cited by examiner

Figure 1

CONVERTING PROGRAMS TO VISUAL REPRESENTATION WITH READING COMPLIED BINARY

INCORPORATED DISCLOSURES

This application incorporates the following documents by reference, each and every one of which as if fully set forth herein:

Application 61/873,616, filed Sep. 4, 2013, in the name of Vicki Thomas, titled "Translation in visual context".

Application 61/873,638, filed Sep. 4, 2013, in the name of Stanton Kee Nethery III, titled "User corrections of translation".

Application 61/873,673, filed Sep. 4, 2013, in the name of Vicki Thomas, titled "Translation under constraints".

Application 61/873,665, filed Sep. 4, 2013, in the name of Stanton Kee Nethery III, titled "Translation on demand".

Application 61/928,918, filed this same day, Jan. 17, 2014, in the name of Eric Choate, titled "Converting programs to visual representation with reading compiled binary".

Application 61/928,927, filed this same day, Jan. 17, 2014, in the name of Eric Choate, titled "Converting programs to visual representation with intercept screen draws".

These documents are sometimes collectively referred to herein as the "Incorporated Disclosures," the "Incorporated Documents," or a variant thereof.

Applicant claims the priority of each and every one of these documents, to the fullest extent available.

BACKGROUND

Field of the Disclosure

This application relates to converting between software program instructions and visual representation, and other matters.

Background of the Disclosure

It sometimes occurs that it can be desirable to convert a program from a first form to a second form, the second form having the property of preserving the visual presentation made by the program, but not necessarily any other factor. For example, in a translation system, it can be desirable for a natural-language translator to be able to examine the program, but not necessarily using the same system configuration on which the program was developed or generated. For example, the original programmer might have used a relatively robust computer system capable of executing an integrated development environment (IDE) for the program, while the natural-language translator has only a relatively modest computer system capable of displaying web pages.

Each of these issues, either alone or in combination with other matters, at some times, or in some conditions, can cause a problem with respect to converting programs to visual representation, with respect to related matters, or some combination or conjunction thereof.

SUMMARY OF THE DESCRIPTION

This Application provides techniques that can ameliorate the problems described above, as well as others. In one embodiment, a method can start with a first software program, such as a software application program (sometimes referred to herein as an "app", as further described herein), from a first form including human-readable program code, which can be compiled into binary program code, which can be executed by a computing device to provide or generate one or more images or other types of output. The method can generate a second form of the software program, the second form having the property of preserving the presentation made by the program, but not necessarily any other factor. This can allow the second form of the software program to be presented (or displayed in any other manner) using a device type or a software environment that it was not necessarily designed for.

In one embodiment, the method examines binary code in the first form of the program, such as might have been created by a compiler or other automated program generator, for particular commands, such as commands that request the operating system (OS) to alter the state of the screen. Such commands can include commands that request the OS to draw dots, lines, or other shapes, or that replace some or all of the entire content of the screen with new material. Upon examining the first form, the method determines a set of program instructions in the second form that would have the same presentation effect (such as the same visual effect).

In a first example, the method can emulate the program as if it were being executed by a computing device, such as a processor. If the program is not well organized, the method can search the object-code of the program (such as using a linear search of all instructions in that object-code) for calls upon the OS to write text to the screen (or to make other outputs, such as audio/visual output, sound, or otherwise). For each such call, the method can examine the object code of the program, for each such object-code call upon the OS, to determine what parameters define the output in a source human language, which a translator can use to alter the program to output in a target human language. In alternative embodiments, suggestions from the programmer can be used to determine all such object-code calls upon the OS to make outputs, or suggestions from the programmer can be used to determine, for each such object-code call upon the OS, which of the parameters control the selection of the particular elements of the source human language, with the effect that those object-code calls can be altered to instead select particular elements of the target human language.

In a second example, if the program is well organized, the method can more easily identify within the program those calls upon the OS to make outputs in the source human language, along with any parameters used to specify those elements of the source human language that are output. In one such case, the program might be organized in a format suitable for use with an iPad™ or iPhone™, or might already be localized for another language, but not the target language desired in this particular case. In such cases, the object-code instructions and data can be structured and organized in known sections, such that they can be readily identified. Similar to the first example above, the method can search appropriate sections of the object-code for calls upon the OS to output in a source human language, examine the object-code near those calls for parameters that define the output, which a translator can use to alter the program to output in a target human language.

When those portions of the object-code of the program are identified that make outputs in the source human language, the program can be replaced with instructions suited to a different device. For example, the program might be written so as to be executed on a hand-held media device such an iPad or iPhone. Elements of the program can be replaced with program code that can be executed on a laptop or desktop business machine. Those elements of the program that make outputs in the source human language can be altered or replaced to provide program code that makes outputs in the target human language, such as by a translator, without the translator needing to have any knowledge of the original program code. Once translated, the altered or replaced portions can be sent to the programmer, who can combine those elements of the program code that were altered or replaced with those elements of the program code that were untouched, to provide a version of the program that operates in the target human language. For example, a game program originally written in English can be translated into French or Mandarin.

DETAILED DESCRIPTION OF AN EMBODIMENT

This Application provides systems and techniques (such as embodied in machines, methods, articles of manufacture, composition of matter, and any other patentable subject matter), which enable programs to be converted between a first (original) form, such as might be written by a programmer in a set of program instructions, and a second (visual) form, such as might be more easily manipulated by a translator seeking to identify and replace phrases in a source natural language with phrases in a target natural language.

In one embodiment, a method identifies program instructions that call upon the operating system (OS) to make changes to the screen, or other user presentation. If the program is not well organized, the method can search the object-code of the program (such as by conducting a linear search of all instructions in that object-code) for calls upon the OS to write text to the screen (or to make other outputs, such as audio/visual output, animation, graphics, sound, haptic or tactile output, olfactory output, combinations or conjunctions thereof, or otherwise).

For each such call, the method can examine the object code of the program, for each such object-code call upon the OS, to determine what parameters define the output in a source human language, which a translator can use to alter the program to output in a target human language. In alternative embodiments, suggestions from the programmer can be used to determine all such object-code calls upon the OS to make outputs, or suggestions from the programmer can be used to determine, for each such object-code call upon the OS, which of the parameters control the selection of the particular elements of the source human language, with the effect that those object-code calls can be altered to instead select particular elements of the target human language.

In one embodiment, the method identifies program instructions that call upon the OS to make changes to the screen, or other user presentation. If the program is well organized, the method can more easily identify within the program those calls upon the OS to make outputs in the source human language, along with any parameters used to specify those elements of the source human language that are output. In one such case, the program might be organized in a format suitable for use with an iPad™ or iPhone™, or might already be localized for another language, but not the target language desired in this particular case. In such cases, the object-code instructions and data can be structured and organized in known sections, such that they can be readily identified. Similar to the other example above, the method can search appropriate sections of the object-code for calls upon the OS to output in a source human language, examine the object-code near those calls for parameters that define the output, which a translator can use to alter the program to output in a target human language.

When those portions of the object-code of the program are identified that make outputs in the source human language, the program can be replaced with instructions suited to a different device. For example, the program might be written so as to be executed on a hand-held media device such an iPad or iPhone. Elements of the program can be replaced with program code that can be executed on a laptop or desktop business machine. Other possibilities besides mobile phones, tablets, laptop, and desktop devices can include mainframe devices, minicomputers, and other user workstations, "netbook"/"Chromebook" devices, "phablet" and phone/tablet hybrids, wearable devices (such as earphones, "smartwatches" and "Google Glass") or implantable devices, combinations and conjunctions thereof, and otherwise. Devices can also include cooperating, logically remote, and/or virtualized elements, such as cluster computing devices, virtual machines, and otherwise.

Those elements of the program that make outputs in the source human language can be altered or replaced to provide program code that makes outputs in the target human language, such as by a translator, without the translator needing to have any knowledge of the original program code. Once translated, the altered or replaced portions can be sent to the programmer, who can combine those elements of the program code that were altered or replaced with those elements of the program code that were untouched, to provide a version of the program that operates in the target human language. For example, a game program written in English can be translated into French.

Figures and Text

Figure 1:
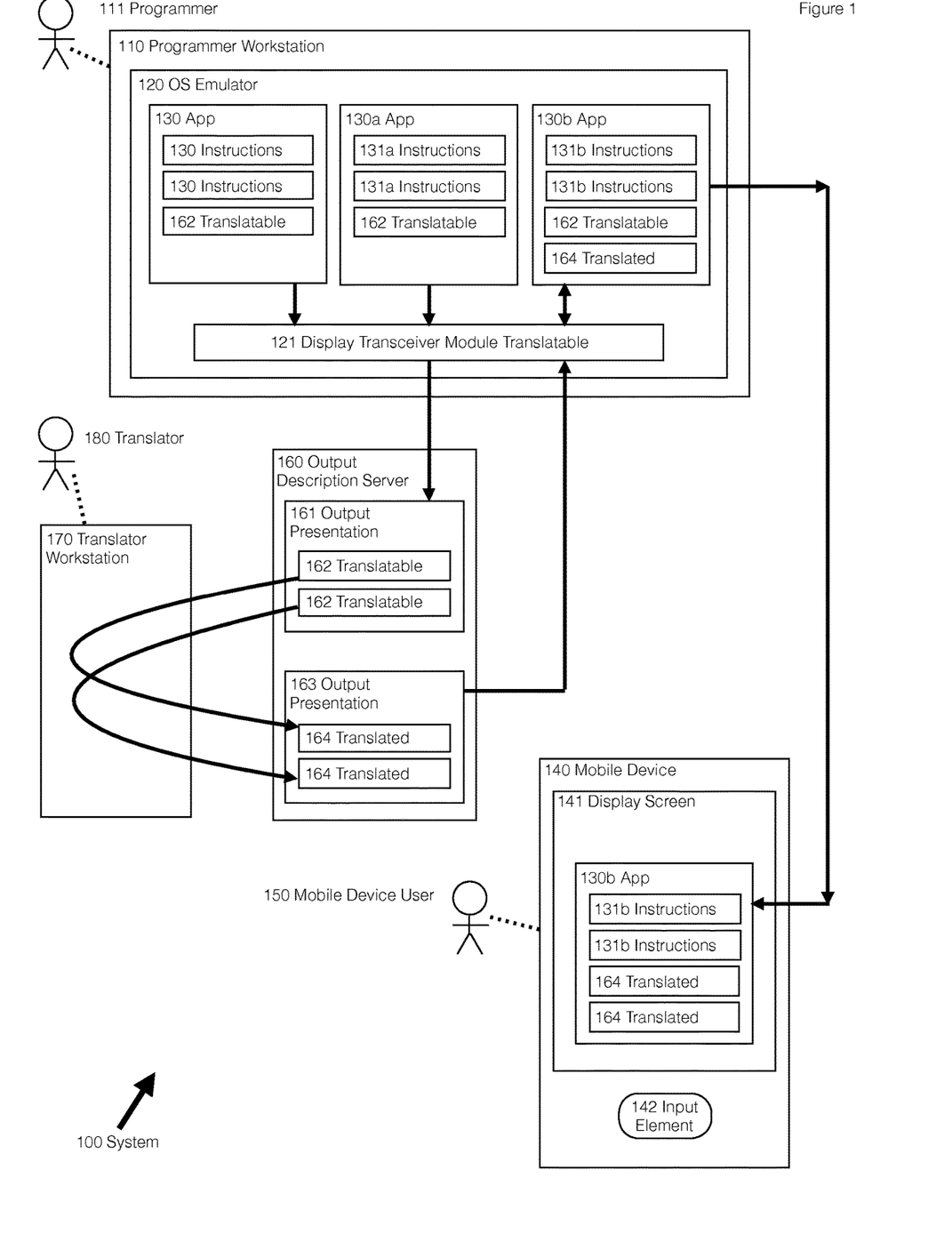
FIG. 1 shows a conceptual drawing of a system.

FIG. 1—System Elements

FIG. 1 shows a conceptual drawing of a system.

System

A system 100 includes at least those elements shown in the figure, and possibly other elements not shown but described herein or otherwise known in the art. These elements include such elements as a programmer workstation 110, an OS or emulator thereof 120, and an app 130. The app 130 can include one or more instructions 131, at least one of which can be disposed to call upon the OS or emulator thereof 120. The app 130 can also be separately executed in a mobile device 140, and can make one or more output presentations at that mobile device 140, such as using a screen 141 on that mobile device 140, ultimately to a user 150.

As described herein, "outputs" or "output presentations" can generally refer to any form of presentation that can be sensed by one or more users 150. Outputs or output presentations can include visual media (still or moving), audiovisual media, audio, smell, haptic or touch outputs, as well as other types of output. Outputs or output presentations can include sensations outside the normal range of human sensory abilities, including audio or visual frequencies that are too low or too high to be perceived by humans (for some examples, ultrasonics might be perceived by animals, electrical stimulation might be perceived as a tingle or as a pain-reliever, electric or electronic signals might be perceived by hardware or software devices designed to parse those signals).

As also described herein, the system 100 can include an output description server 160, coupled to the emulator 120. The emulator 120 can be disposed to receive output information from the app 130 and to translate that output information into one or more descriptions of viewable or hearable outputs to be used by a translator (180), and send those descriptions to the output description server 160. The output description server 160 is disposed to receive those descriptions (such as in a markup language like HTML, SGML, or a variant thereof), and send them to a translator workstation 170 for rendering as output presentations to the translator 180. The translator workstation 170 receives those descriptions and can present the output presentations to the translator 180.

The translator 180 can thus determine the intended human meaning of translatable elements of the outputs in the context of the description. The translator 180 can communicate with the programmer 111, rewrite (or comment upon) those translatable elements, and can provide a set of replacements for those translatable elements after consideration of all relevant contextual information. This can have the effect that the translator 180 can translate the outputs in view of the context in which they were output by the app 130. Thus, the translator 180 can distinguish between uses of the English word "hot" that should be translated into Spanish as "calor" (very warm), versus those that should be translated into Spanish as "caliente" (very spicy).

While this Application is primarily described with respect to visual presentation to a screen 141 on a mobile device 140, in the context of the invention, as clearly noted above, there is no particular requirement for any such limitation. For a first example, the presentation can include audio and/or audio-visual elements, such as spoken words, other sounds (including without limitation, ultrasonic frequencies), audio-visual material, animation, combinations or conjunctions thereof, of otherwise. For a second example, the presentation can include other elements, such as infrared or ultrasonic frequencies, buzzing or electric stimulation, haptic elements or tactile or texture-like output, olfactory output, output information signals (such as for electric or electronic devices), combinations or conjunctions thereof, or otherwise.

Moreover, while this Application is primarily described with respect to an individual human user 150 capable of operating the mobile device 140 or viewing the screen 141 thereon, in the context of the invention, there is no particular requirement for any such limitation. For a first example, the presentation can include elements disposed for reception by users 150 who are animals, such as dogs, and can include ultrasonic elements that are capable of eliciting desired behavior from those animals. For a second example, the user 150 can include more than one human being operating conjunctively or cooperatively, such as a number of persons each authorized, or collectively authorized, to access the mobile device 140. For a third example, the user 150 can include another device, such as an artificial intelligence or machine learning program, or another control element.

Moreover, while this Application is primarily described with respect to a single app 130, which includes a set of instructions 131, at least some of which include translatable elements 162; in the context of the invention, there is no such particular requirement. In alternative embodiments, there can be additional apps 130*a*, with instructions 131*a*, and 130*b*, with instructions 131*b*. Each such app 130 can include translatable elements 162, with one or more such apps 130 including translated elements 164. The translated elements 164 can also be retrieved from the output description server 160, as described herein.

Operating System

As described herein, the system 100 can include an OS 120, such as the Android OS, iOS OS, or another OS such as a Linux OS, or a variant of one or more of these, capable of receiving first commands, information, and/or instructions (sometimes referred to herein as first "display instructions", "output instructions", or variants thereof) from the programmer workstation 110. The OS 120 can be capable of compiling or interpreting (or otherwise understanding without compilation or interpretation, such as by pattern matching, expert reasoning, case-based reasoning, fuzzy logic, or otherwise) those first display instructions, with or without assistance (such as by additional devices similar to cloud computing devices, compiler or interpreter assistances, and/or graphical processing devices), into second display instructions, destined for the presentation device 140 and intended to cause the presentation device 140 to make such presentations as desired by the app. The second display instructions can be disposed to be generic in form, so as to be able to be compiled or interpreted and destined to be used on different types of presentation device 140.

The OS 120 can include a display transceiver module 121, further capable of receiving first display instructions and compiling or interpreting those first display instructions into control signals or second display instructions destined for the presentation device 140. As further and otherwise described herein, the display transceiver module 121 can receive those first display instructions in one or more different formats: (A) The display transceiver module 121 can receive those first display instructions in an arbitrary form as designated by a programmer or as designated by a compiler or interpreter in response to human-readable program instructions from a programmer. (B) The display transceiver module 121 can receive those first display instructions in a form as specified by a structured program format, such as a program format for an iPad™ or iPhone™, as described herein.

While this Application is primarily described with respect to the first display instructions being formatted in binary and readable by a hardware computing device, such as a processor and its associated chipset, in the context of the invention, there is no particular requirement for any such limitation.

For a first example, the first display instructions can be formatted in Java byte code and can be readable by a software element embodied on a hardware computing device, or a first hardware device emulated in software on a second hardware device, such as a Java virtual machine (JVM).

For a second example, the first display instructions can be formatted in a Lisp machine code and can be readable by a hardware device (or a first hardware device emulated in software on a second hardware device).

For a third example, the first display instructions can be formatted as instructions for a Universal Turing Machine (UTM) or a Finite State Machine (FSM) and can be readable by a hardware device (or a first hardware device emulated in software on a second hardware device).

These different embodiments are applicable whether the program instructions are produced by one or more programmers directly (in an "unstructured" format as described herein), or produced by a compiler operating at the direction of one or more programmers (similarly, in an "unstructured" format as described herein), or whether produced in a structured format such as the Mach-O format at the direction of one or more programmers directly, or produced by a compiler operating at the direction of one or more programmers (such as described herein).

Presentation Device

As described herein, the system 100 can include a presentation device 140, such as a hand-held media device or other mobile device. The presentation device 140 can include one or more presentation elements, such as one or more display screens 141 or otherwise, and can include one or more input elements 142, such as possibly buttons, pointing devices, touchpad elements, facial or fingerprint recognition, or otherwise.

While this application is primarily described with respect to the presentation device 140 including one or more display screens 141 as presentation devices, in the context of the invention, there is no particular requirement for any such limitation. For example, the one or more presentation devices 140 can include elements disposed to present pictures (such as bitmap, raster, vector, or other elements perceivable or perceived by humans or others as visual input, whether in black and white, color, or other frequencies such as infrared—sometimes perceived as heat—or ultraviolet—sometimes perceived as florescence—), sounds (such as bells, buzzers, speakers, vibration elements, whistles, or other elements such as those capable of emitting infrasound—sometimes perceived as vibrations or other effects—) and/or capable of emitting ultrasound—sometimes transceivable into visual elements by other devices—, audio-visual elements (such as animation, motion pictures, and other combinations or synchronizations of sight and sound), electrical signals (sometimes perceived as muscular stimulation such as in various forms of medical procedures, tingling, or otherwise), haptic outputs (such as buzzing, shock, vibration, or otherwise), olfactory elements, or other possible outputs perceivable or perceived by humans or others. For example, presentation devices 140 can include elements that can be configured to be perceptible to non-human animals, such as cats or dogs, such as for the purpose of alerting or communicating with, or eliciting desired behavior from, such creatures.

While this Application is primarily described with respect to the presentation device 140 including buttons as input elements 142, in the context of the invention, there is no particular requirement for any such limitation. For example, the one or more presentation devices 140 can include other forms of input elements, such as touch pads, touch screens, proximity sensors, fingerprint detectors or sensors, devices capable of receiving or recognizing faces or facial expressions, gestures—whether intentional or otherwise—, muscle tension or pressure, olfactory inputs, speech—in one or more natural languages—, or other possible inputs.

In some embodiments, the one or more presentation devices 140 can include a smartphone, such as one using the Android or iOS operating system (OS), or another type of mobile presentation device, such as a mobile entertainment device similar to an iPad or other MP3 player, including one or more sets of information for entertainment (where that information includes instructions, they are sometimes referred to herein as software application programs or "apps", as further described herein), or other mobile computing device capable of performing the functions of the presentation device 140 as described herein. The presentation device 140 can also include a desktop, laptop, netbook, or other computing device capable of performing the functions of the presentation device 140 as described herein.

Application Program

The system 100 can include an app 130, such as those shown as 130a and 130b, or a combination or conjunction thereof, or a variant of any of the preceding. The app 130 is generally provided by the programmer, and is intended to be executed or interpreted on the one or more presentation devices 140. In one embodiment, the app 130 interacts with one or more users 150, using the one or more presentation devices 140, and providing one or more user experiences as a consequence thereof. For example, the app 130 can provide a data analysis program for use by one or more users at the presentation device 140, or can provide a (educational, training, or other) game for use by one or more users 150 at the presentation device 140, or can provide a game for use by one or more users 150 at multiple presentation devices 140 (such as the games of Chess, "Scrabble,"™ or the game "World of Warcraft,"™ available for concurrent use by multiple users 150 as players as disparate locations), or can provide a social media communication network for use by one or more users 150 at multiple presentation devices 140 (such as the social media communication networks available from Facebook™ or Twitter™ available for concurrent or separate use by multiple communicating users as disparate locations). Possibly more prosaically, the app 130 can provide a utility usable by one or more users at an individual presentation device 140, such as a utility for manipulating the functions or status of the individual presentation device 140 itself.

As described herein, the app 130 can include one or more program instructions 131a or 131b, providing execution/interpretation points at which the app 130 can attempt to write to the one or more screens 141 of the one or more presentation devices 140, or otherwise produce human-language output, as described herein. As described herein, the app 130 might have originally been written to provide these human-language outputs in a particular natural human language, such as English, and it might be desirable for particular users to instead provide these human-language outputs in a different natural human language, such as French or Mandarin. In such cases, as described herein, it would be desirable to identify all such instructions at which the app 130 attempts to write to the one or more screens 141 of the one or more presentation devices 140, or otherwise produce human-language output in a first natural language, as described herein, contemplating the possibility of replacing the strings, pictures, audio, or other output with different outputs in a second natural language.

As described herein, once the system 100 can identify those instructions in the app 130 at which the app 130 attempts to make an output to the presentation device 140 in a first natural language, the system can be capable of replacing those outputs with different outputs to the presentation device 140 in a second natural language, as described in further and other detail herein.

Output Description Server

In one embodiment, the description server 160 receives output information from the app 130. For example, in one embodiment, the description server 160 can receive successive output instructions from the app 130 as the emulator 120 encounters those output instructions. In such embodiments, the description server 160 can collect a sequence of such output instructions from the app 130, until the description server 160 determines that a complete screen 141 has been written to the mobile device 140.

In such embodiments, the description server 160 would then collect those outputs and determine what was intended for display on the screen 141, and how that screen display would be described in a rendering language (such as HTML or SGML) for such display. The description server 160 would then prepare one or more messages including that description, and send those messages to the translator workstation 170 for review by the translator 180.

In one embodiment, the description server 160 can identify output information by the nature of the output instruction. For one example, if the app 130 provides output text, the output instruction will often receive a text string as an input parameter. For a second example, if the app 130 provides output line drawings, the output instruction will often receive a specification of a curve or line (such as a Bezier curve) as an input parameter. For a third example, if the app 130 provides output photographs or other relatively high-resolution pictures, the output instruction will often receive a specification of a picture, such as in GIF or JPG format, as an input parameter. In each of these cases, the description server 160, if it is given the nature of the parameter, can construct a syntactically correct description in the markup language or other description language it uses.

Translator Workstation

As described herein, the translator workstation 170 receives the description from the description server 160. In one embodiment, the translator workstation 170 maintains the description in memory or mass storage, and provides a first output presentation 161 to the translator 180. The first output presentation 161 can include one or more first translatable elements 162, such as text strings that are rendered in a first human language, such as English, and are intended to be translated into a second human language, such as Russian or Finnish.

For one example, such as when the outputs are displays for the screen 141 of the mobile device 140, the translator workstation 170 can present the first output presentation 161, including its first translatable elements 162, in conjunction with one or more blank forms for second output presentations 163 for rewritten versions thereof, the latter including corresponding second translatable elements 164. The translator 180 can complete the second output presentations 163 by entering data for use as the second translatable elements 164.

In one embodiment, the second translatable elements 164 correspond to post-translated versions of the first translatable elements 162. For example, the first translatable elements 162 might include a string having the English language phrase "Hello, World!", while the second translatable elements 164 might include a string having a Russian or Finnish language equivalent thereof. Where there is more than one equivalent, the equivalent more suited to context would be selected by the translator 180, as descried herein.

As described herein, when the translator 180 has rewritten the first output presentation 161 into the second output presentation 163, the description server 160 can retrieve that information from the translator workstation 170. In one embodiment, the description server 160 can transform the information from the format it retrieved it from the translator 180, and write that information back to the emulator 120 for transit to the programmer workstation 110. In alternative embodiments, the description server 160 can write that information directly back to the programmer workstation 110.

For one example, the programmer 111 at the programmer workstation 110 can localize the app 130, in view of the information retrieved from the translator 180 by the description server 160. For another example, the programmer workstation 110 can include an automated software element (not shown) that localizes the app 130 without assistance by the programmer 111. In such cases, the automated software element (not shown) can generate the necessary localization data structures, rewrite the app 130 to use those localization data structures, and provide the rewritten app 130 to the programmer 111.

Figure 2:
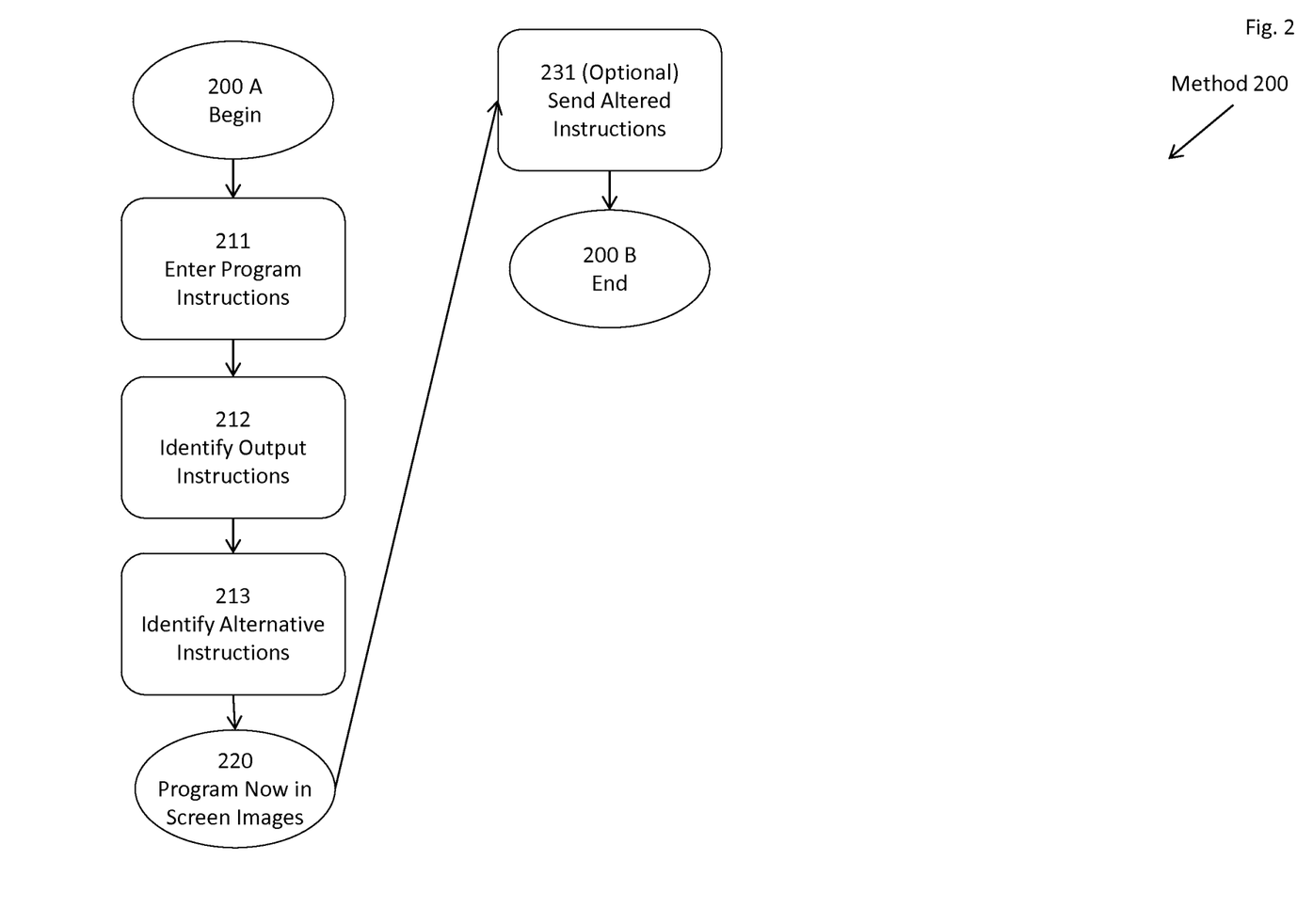
FIG. 2 shows a conceptual drawing of a method.

FIG. 2—Method of Operation

FIG. 2 shows a conceptual drawing of a method.

A method 200 can be performed by the apparatuses and system 100, or combinations or conjunctions of elements thereof. Where described herein that a step is performed by the method 200, it should be understood from context (or from the figure) which portion of the system 100 takes the specific actions described for that step.

Although the steps are shown in a particular order, in the context of the invention, there is no reason for any such limitation. The steps may be performed in a different order, or may be performed in a parallel or pipelined manner, or otherwise.

In one embodiment, the method 200 is performed in conjunction or cooperation with one or more programmers (not shown) and one or more translators (not shown). As soon as the method 200 has identified those one or more program instructions 131a or 131b that are capable of presenting one or more outputs at the presentation device 140, the method 200 can send one or more descriptions of those operations from the programmer workstation no to the translator workstation (not shown). While this application is primarily described with respect to the method 200 operating serially after identifying those one or more program instructions 131a or 131b that are capable of presenting one or more outputs at the presentation device 140, in the context of the invention, there is no particular requirement for any such limitation. For example, the method 200 can operate concurrently or in conjunction with, or in parallel with, those one or more steps of identifying one or more program instructions 131a or 131b that are capable of presenting one or more outputs at the presentation device 140.

The translator (not shown) can use a relatively much simpler program, such as a text editor or web browser, to modify those one or more descriptions of those operations, to translate them from a source natural language (such as English) to a target natural language (such as French or Mandarin). As soon as the translator has made any alterations the translator deems necessary or desirable, the method 200 can send one or more descriptions of those operations from the translator workstation (not shown) to the programmer workstation no. While this application is primarily described with respect to the method 200 operating serially after identifying those one or more program instructions 131a or 131b that are capable of presenting one or more outputs at the presentation device 140, in the context of the invention, there is no particular requirement for any such limitation. For example, the method 200 can operate concurrently or in conjunction with, or in parallel with, those one or more steps of altering program instructions.

Beginning of Method. A flow point 200A indicates a beginning of the method 200.

At a step 211, one or more programmers (not shown) enter one or more program instructions 131 into the programmer workstation 110 for use by the app 130. The programmer workstation no can show the one or more instructions 131 to the one or more programmers (not shown) in a format that allows for ease of code construction, ease of editing, ease of detecting errors, or other factors.

At a step 212, the system 100, optionally with the assistance of the one or more programmers, identifies those one or more program instructions 131 that direct the presentation device 140 to output one or more signals to one or more users 150. As a part of this step, the system 100, again optionally with the assistance of the one or more programmers, identifies one or more parameters for those one or more program instructions 131 that direct the presentation device 140 to output one or more signals to one or more users 150. In embodiments in which the app 130 is not particularly well structured, the system 100, optionally with assistance, searches for one or more program instructions 131 that call upon the OS to make changes to the screen 141 of the presentation device 140, and having found those, searches for one or more parameters to those calls upon the OS. In embodiments in which the app is well-structured, the system 100 can use that structure to find those one or more program instructions 131 that call upon the OS to make changes to the screen 141 of the presentation device 140. In such embodiments, the system 100 can use that structure to determine those one or more parameters to those calls upon the OS.

At a step 213, the system 100, again optionally with the assistance of the one or more programmers, identifies one or more alternative instructions that could be performed on a translator's workstation (not shown) with substantially the same effect. In one embodiment, the system 100, again optionally with assistance, can identify those alternative instructions that could be performed on a translator's workstation in response to whether the program app 130 includes one or more program instructions 131 that are not relatively well structured, or whether the program app 130 includes all but a relatively few program instructions 131 that are relatively well-ordered in a known structure.

While this Application is primarily described with respect to the system 100 being optionally assisted by the one or more programmers, in the context of the invention, there is no particular requirement for any such limitation. For a first example, the system 100 could be optionally assisted by another programming expert, or semi-expert, or by one or more artificial intelligences, machine learning programs, or other control programs. For a second example, the system 100 could be optionally assisted by one or more translators (not shown), whether using one or more translator workstations (not shown) or otherwise. In alternative embodiments, combinations or conjunctions of the above can be used, or other apparatuses, systems, or methods with substantially the same effect.

At a flow point 220, the system 100 has translated operation of the program into one or more portions of the program app 130, and its program instructions 131, from program instructions available to the programmer 111 to page descriptions of screen images that could be used by the translator 180, or presented on the presentation device 140 to the user 150.

Sent to Translator. In alternative embodiments, at an optional step 231, the system 100 can optionally send the altered program instructions 131 to the one or more translators, so that the latter can determine if they have sufficient information to translate the presentation, intended to be made by the program app 130, from the source natural language (such as English) to the target natural language (such as French or Mandarin). In such alternative embodiments, the system 100 can send the altered program instructions 131, in a first sub-step, to the OS 120, and can send the altered program instructions 131, in a second sub-step, to the mobile device 140. The system 100 can receive information from the one or more translators with respect to whether those one or more translators are able to relatively fully use those one or more alternative instructions that could be performed on a translator's workstation with substantially the same effect.

While this application is primarily described with respect to the system 100 only sending the altered program instructions 131 to the one or more translators after the alteration is complete, in the context of the invention, there is no particular requirement for any such limitation. For example, the system 100 can optionally send the altered program instructions as they are being identified or altered, concurrently or in conjunction with their being identified or altered, in a parallel or pipelined manner, after being triggered by one or more events, or otherwise. Moreover, while this Application is primarily described with respect to the system 100 only receiving feedback from the one or more translators after substantially all of the altered program instructions have been reviewed by the one or more translators, in the context of the invention, there is no particular requirement for any such limitation. For example, the system 100 can optionally return feedback with respect to the altered program instructions as they are being examined or tested by the one or more translators, concurrently or in conjunction with their being so examined or tested, in a parallel or pipelined manner, or otherwise.

While this application is primarily described with respect to direct communication between the one or more programmer workstations 110 and the one or more translator workstations (not shown), in the context of the invention, there is no particular requirement for any such limitation. For example, the one or more programmer workstations 110 and the one or more translator workstations can be coupled by any communication medium, such as a set of shared memory locations on one or more servers, a communication network having one or more routers or switches, some combination or conjunction thereof, or otherwise.

In one embodiment, either or both of the first sub-step and the second sub-step can include use of a protocol for transmitting information, such as the HTTP protocol or a variant thereof. However, in the context of the invention, there is no particular requirement for any such limitation; any suitable communication protocol can be used. Moreover, in one embodiment, communication between the programmer workstation 110 and the translator workstation (not shown) can include a client-server model of interaction or a peer-peer model of interaction. However, in the context of the invention, there is no particular requirement for any such limitation; communication between the programmer workstation no and the translator workstation can include any other suitable model of interaction.

End of Method. A flow point 200B indicates an end of the method 200. The method 200 repeats until both the one or more programmers and translators are satisfied with the result. Alternatively, the method 200 may repeat until some selected condition occurs.

Alternative Embodiments

Elements of the apparatuses, systems, and methods are described herein with respect to one or more possible embodiments, and are not intended to be limiting in any way. In the context of the invention, there is no particular requirement for any such limitations as described with respect to any elements of the system. For example, individual elements of the system 100 could be replaced with substitutes that perform similar functions. Moreover, as described herein, many individual elements of the system are optional, and are not required for operation.

Although the one or more control elements of the system are described herein as being executed as if on a single computing device, in the context of the invention, there is no particular requirement for any such limitation. For example, the one or more control elements of the system can include more than one computing device, not necessarily all similar, on which the element's functions are performed.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While this application is primarily described with respect to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure and the inventive subject matter.

The invention claimed is:

1. A method, including steps of
receiving information specifying a first format of program code for a software program disposed to be performed on a first type of device, said software program when in said first format generating one or more outputs using output commands calling upon an operating system;
performing one or more operations of said software program using a emulator, said emulator searching within said first format of program code to find program instructions in said first format that call upon the operating system to make a user presentation;
identifying and retrieving parameters of said program instructions, and recording parameters to said output commands;
maintaining said parameters in a first database;
responsive to said first database, providing a description of said outputs, said description sufficient to generate a visual representation of said outputs that preserves the user presentation of said outputs in said first format;
providing a second format of said program code having an altered version of said program instructions, wherein said second format of said program code is disposed to be performed on a second type of device, said second type of device being disposed to be operated by a translator and to provide said translator with the ability to alter said program instructions in said first format without needing to know which ones of said program instructions call upon said operating system to make the user presentation;
translating one or more elements of said outputs;
localizing said software program in response to said steps of translating;
wherein said steps of translating include steps of sending said parameters to said translator, and receiving from said translator a second database of outputs in a human language;
wherein said second database includes a translated version of said first database when said first database is interpreted as a first human language and said second database is interpreted as a second human language.

2. The method as in claim 1, wherein
said steps of localizing provide a second software program that preserves the user presentation of said outputs of said first format of program code in a distinct presentation environment, said distinct presentation environment differing from said software program in one or more of:
a hardware environment; or
a software environment.

3. The method as in claim 1, wherein
said output commands include one or more parameters; and
said parameters have the property of defining an output in the human language.

4. The method as in claim 1, wherein
said outputs include one or more of:
altering a state of a screen;
producing a buzzing, haptic, or tactile output;
producing electrical stimulation;
producing olfactory output; or
producing output information signals.

5. The method as in claim 1,
wherein said outputs include producing an audio output.

6. The method as in claim 1,
wherein said first type of device includes a stand-alone hand-held media device;
said second type of device includes a stand-alone laptop or desktop device.

7. An apparatus including
one or more computers, collectively including memory maintaining information specifying a first format of program code for a software program disposed to be performed on a first type of device, said software program when in said first format generating one or more outputs using output commands calling upon an operating system;
a software program emulator, said software program emulator disposed to search within said first format of program code to find program instructions in said first format that call upon the operating system to make a user presentation, identifying and retrieving parameters of said program instructions, and recording parameters to said output commands;
a first database disposed to maintain said parameters;
said apparatus being disposed to, responsive to said first database, provide a description of said outputs, said description sufficient to generate a visual representation of said outputs, in response to a second software program having an altered version of said program instructions that preserves the user presentation of said outputs in said first format;
said second software program having a second format of said program code having an altered version of said program instructions, disposed to be performed on a second type of device, said second type of device being disposed to be operated by a translator and to provide said translator with the ability to alter said program instructions in said first format without needing to know which ones of said program instructions call upon said operating system to make the user presentation;

a second database maintaining one or more of captured elements of output upon performing one or more of said output commands;

wherein said translator is responsive to said outputs maintained in said second database;

said second database responsive to translating one or more translatable elements of said output, and a localized variant of said second software program responsive to said second database;

wherein said second database includes a translated version of said first database when said first database is interpreted as a first human language and said second database is interpreted as a second human language.

8. The apparatus as in claim 7, wherein
said localized variant provided said second software program that preserves the user presentation of said outputs of said first format of program code in a distinct presentation environment, said distinct presentation environment differing from said software program in one or more of:
a hardware environment; or
a software environment.

9. The apparatus as in claim 7, wherein
said output commands include one or more parameters; and
said parameters have the property of defining an output in a human language.

10. The apparatus as in claim 7,
wherein said outputs include one or more of:
altering a state of a screen;
producing a buzzing, haptic, or tactile output;
producing electrical stimulation;
producing olfactory output; or
producing output information signals.

11. The apparatus as in claim 7,
wherein said outputs include an audio output.

12. The apparatus as in claim 7, wherein
said first type of device includes a stand-alone hand-held media device;
said second type of device includes a stand-alone laptop or desktop device.

* * * * *